(12) United States Patent
Cairns

(10) Patent No.: US 8,605,771 B2
(45) Date of Patent: Dec. 10, 2013

(54) DATA TO PILOT RATIO ESTIMATION

(75) Inventor: Douglas A. Cairns, Durham, NC (US)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 996 days.

(21) Appl. No.: 12/637,838

(22) Filed: Dec. 15, 2009

(65) Prior Publication Data

US 2011/0142101 A1    Jun. 16, 2011

(51) Int. Cl.
*H04B 1/69* (2011.01)
*H04B 1/713* (2011.01)

(52) U.S. Cl.
USPC ............ 375/147; 375/148; 375/150; 375/316

(58) Field of Classification Search
USPC .......................... 375/147, 148, 150, 316, 136
See application file for complete search history.

(56) References Cited

U.S. PATENT DOCUMENTS

| | | | |
|---|---|---|---|
| 7,590,167 B2 | 9/2009 | Fulghum et al. | |
| 7,986,680 B2 * | 7/2011 | Kim et al. | 370/341 |
| 2005/0136840 A1 * | 6/2005 | Molnar et al. | 455/63.1 |
| 2006/0188006 A1 | 8/2006 | Cairns | |
| 2007/0173201 A1 * | 7/2007 | Pietraski et al. | 455/67.11 |

* cited by examiner

*Primary Examiner* — Qutbuddin Ghulamali

(57) ABSTRACT

A CDMA receiver computes an accurate estimate of the data to pilot power ratio. First, a biased estimate of the data to pilot power ratio is obtained from the data channel. A multiplicative correction factor is then computed from the pilot channel, and applied to the biased data to pilot power ratio estimate.

7 Claims, 2 Drawing Sheets

DATA TO PILOT RATIO ESTIMATION

FIELD OF THE INVENTION

The present invention relates generally to wireless communications, and in particular to a method of estimating the data to pilot power ratio in CDMA networks.

BACKGROUND

Wireless communications are a ubiquitous part of modern life in many areas. One well known and widely deployed wireless communication protocol is Code Division Multiple Access (CDMA). CDMA networks use spread-spectrum technology, encoding (spreading) data for different users with different, orthogonal codes, and transmitting the higher-bandwidth encoded signals over the same frequency. In a CDMA system, each code sequence comprises a separate communication channel. Known reference symbols, called pilot symbols, are transmitted over a separate channel from the data symbols (that is, spread with a different code than the data symbols). Receivers use the pilot channel to estimate required receiver quantities.

Note that estimates obtained from the pilot channel are scaled according to the pilot channel power, which is typically significantly higher than the data channel power(s). Receiver operations that require estimates scaled according to the data channel power may obtain properly scaled estimates through the use of the data to pilot power ratio. For example, the pilot channel may be used to estimate the net channel coefficients ($h_{pilot} = \sqrt{E_p} h$). Some receiver operations require an estimate of the net channel coefficients scaled according to the data channel power ($h_{data} = \sqrt{E_d} h$). Using the relationship $h_{data} = g h_{pilot}$, where $g = \sqrt{E_d/E_p}$ (i.e., the square root of the data to pilot power ratio), the receiver can obtain the net channel estimates with the proper scaling.

The data to pilot power ratio is useful in many contexts. An example is soft value scaling for turbo decoding. For 16 QAM and 64 QAM constellations, the log-likelihood of bit $b_j$ can be written $$LLR(b_j) = \frac{\sum_{s_i \in S_0(j)} \exp\left\{\gamma\left(2Re\left(\frac{s_i^* z}{w^H h_{data}}\right) - |s_i|^2\right)\right\}}{\sum_{s_i \in S_1(j)} \exp\left\{\gamma\left(2Re\left(\frac{s_i^* z}{w^H h_{data}}\right) - |s_i|^2\right)\right\}} \quad (1)$$

where z represents an estimated symbol value, $s_i$ is an actual symbol value, $\gamma$ is the signal to noise ratio, and w is a vector of combining weights. Using the data to pilot power ratio and the pilot-based channel estimates, equation (1) can be evaluated via $$LLR(b_j) = \frac{\sum_{s_i \in S_0(j)} \exp\left\{\gamma\left(2Re\left(\frac{s_i^* z}{gw^H h_{pilot}}\right) - |s_i|^2\right)\right\}}{\sum_{s_i \in S_1(j)} \exp\left\{\gamma\left(2Re\left(\frac{s_i^* z}{gw^H h_{pilot}}\right) - |s_i|^2\right)\right\}} \quad (2)$$

Another receiver operation that requires accurate data to pilot power ratio is Signal to Interference and Noise Ratio (SINR) estimation. Co-pending U.S. patent application, "Data-Aided SIR Estimation," by Rosenqvist, et al., filed concurrently with the present application, assigned to the assignee of the present application, and incorporated herein by reference in its entirety, discloses the use of estimated data symbols to improve the reliability and accuracy of SINR estimates. The general approach is 1. obtain estimated data symbols;
2. normalize the symbols to match the power of the transmitted constellation (alternatively, scale a reference constellation to match the power of the received data);
3. determine the closest constellation point for each estimated data symbol (i.e. hard symbol decisions);
4. determine signal power as the average power of the detected constellation points;
5. determine noise power as the average power of the difference between the scaled data symbols and the detected constellation points; and
6. correct for bias caused by incorrect hard symbol decisions.

Step 2 in this procedure requires the normalization of the data symbols. An estimated data symbol value can be written as $$z_k = w^H h_{data} s_k + u_k \quad (3)$$
$$= A s_k + u_k$$

so the proper normalization factor is $A = w^H h_{data}$. Using the data to pilot power ratio and the pilot-based channel coefficients, a good estimate of A can be obtained from $$A = g w^H h_{pilot} \quad (4)$$

A number of methods for determining the data to pilot power ratio are known in the art. Co-pending U.S. patent application Ser. No. 11/064,351, "A Method and Apparatus for Estimating Gain Offsets for Amplitude-Modulated Communication Signals," by Cairns, filed Feb. 23, 2005, assigned to the assignee of the present application and incorporated herein by reference in its entirety, provides an overview of the methods known up to 2004, and the drawbacks of each of them. Two additional approaches have been explored since 2004.

One approach is the Algebraic Solution. The data to pilot power ratio can be obtained via $$g = \sqrt{\frac{E\{zz^*\} - w^H h_{pilot}}{|w^H h_{pilot}|^2}} \quad (5)$$

where $$E\{zz^*\} = \frac{1}{CK} \sum_{c=0}^{N_c-1} \sum_{k=0}^{K-1} z_k^c (z_k^c)^*. \quad (6)$$

Here, $z_k^c$ is the $k^{th}$ estimated data symbol corresponding to code c, C is the number of codes used, and K is the number of data symbols per slot.

The main shortcoming of the Algebraic Solution is that the numerator of equation (5) tends to be quite noisy. A noisy numerator necessarily means noisy data to pilot power estimates. This leads to degraded performance for turbo decoding and SINR estimation. The numerator is noisy primarily for two reasons. First, there is an assumption that $w = R_u^{-1} h_{pilot}$. This is true only for a G-Rake (Generalized Rake) receiver, and only if the combining weights are determined exactly. In practice, some sort of iterative approach for determining w is generally used, so the combining weights are not exact. The second reason the numerator is noisy is that the pilot-based net channel estimates use a limited number of symbols. The noise due to estimation error can be substantial, especially when the SINR is low. Accordingly, in practice, the Algebraic Solution does not yield accurate data to pilot power ratio estimates.

Another approach is the Parametric G-Rake solution, wherein the data to pilot power ratio is determined as a by-product of determining the scaling factors for a parametric G-Rake receiver. Typically, a parametric G-Rake receiver uses an estimate of the impairment covariance matrix obtained from the pilot channel to determine the scaling factors. U.S. Pat. No. 7,590,167, "A Method and Apparatus for QAM Demodulation in a Generalized Rake Receiver," by Fulghum, et al., issued Sep. 15, 2009, assigned to the assignee of the present application and incorporated herein by reference in its entirety, discloses the use of the data covariance matrix. The utility of this approach can be seen by writing the components of the data covariance matrix $$R_d = \alpha R_l + \beta R_n + \frac{E_d}{E_p} h_{pilot} h_{pilot}^H \qquad (7)$$

When the scale factors are determined by the least squares fitting procedure described in the '167 patent, an estimate of the data to pilot power ratio is obtained as a by-product. However, this method only applies to G-Rake receivers.

SUMMARY

According to embodiments disclosed and claimed herein, an accurate estimate of a data to pilot power ratio is derived by first obtaining a biased estimate of the data to pilot power ratio. A multiplicative correction factor is then computed from the pilot channel, and applied to the biased data to pilot power ratio estimate.

One embodiment relates to a method of determining a data to pilot power ratio in a CDMA wireless communication network. Pilot symbols are received in a pilot channel and data symbols are received in a data channel. A biased estimate of the data to pilot power ratio based on the data symbols is obtained. A multiplicative correction factor is computed from the pilot channel. The correction factor is applied to the biased data to pilot power ratio estimate to obtain a more accurate data to pilot power ratio estimate.

Another embodiment relates to a CDMA receiver. The receiver includes a receiver circuit operative to receive data symbols in a data channel and pilot symbols in a pilot channel. The CDMA receiver further includes a controller operative to control the operation of the receiver circuit, and further operative to obtain a biased estimate of the data to pilot power ratio based on the data symbols; compute a multiplicative correction factor from the pilot channel; and apply the correction factor to the biased data to pilot power ratio estimate to obtain a more accurate data to pilot power ratio estimate.

Still another embodiment relates to a User Equipment (UE) operative in a CDMA wireless communication network. The UE includes one or more antenna and a receiver operatively coupled to the antenna and operative to receive data symbols in a data channel and pilot symbols in a pilot channel. The UE further includes a controller operative to control the operation of the receiver circuit, and further operative to obtain a biased estimate of the data to pilot power ratio based on the data symbols; compute a multiplicative correction factor from the pilot channel; and apply the correction factor to the biased data to pilot power ratio estimate to obtain a more accurate data to pilot power ratio estimate.

DETAILED DESCRIPTION

Figure 1:
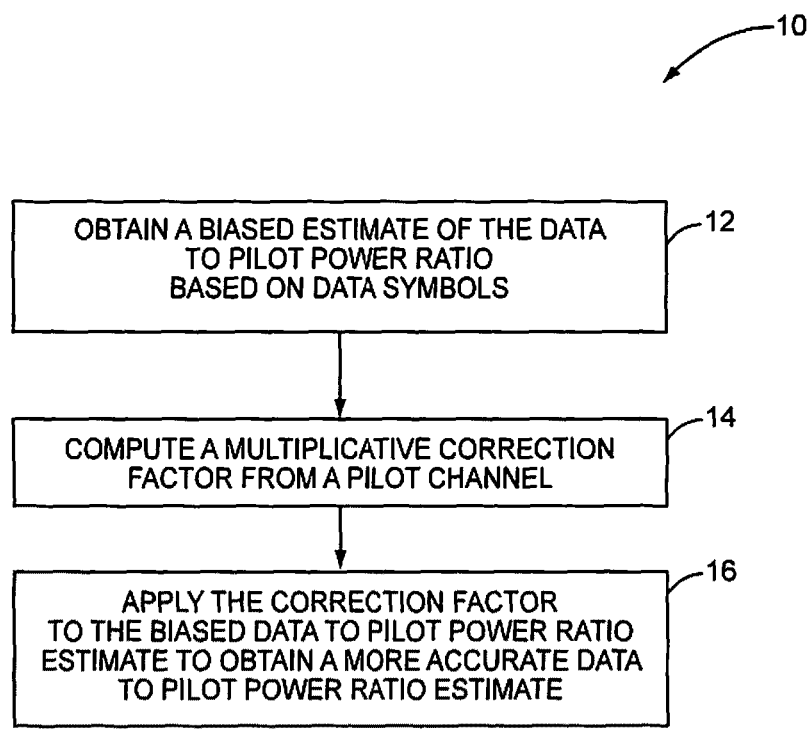
FIG. 1 is a flow diagram of a method of estimating the data to pilot power ratio in a CDMA system.

According to embodiments of the present invention, a biased estimate of the data to pilot power ratio is obtained, and then a correction for the bias, in the form of a multiplicative scaling term, is applied to obtain a more accurate estimate of the data to pilot power ratio. This method 10 is depicted in FIG. 1. Assuming the use of combined data symbols from C codes, the average power of these symbols is $$E\left\{\frac{1}{CK}\sum_{c=0}^{N_c-1}\sum_{k=0}^{K-1} z_k^c (z_k^c)^*\right\} = E_d |w^H h|^2 + w^H R_u w. \qquad (8)$$

Dividing equation (8) by $E_p|w^H h|^2$ gives the desired biased estimate of the data to pilot power ratio (FIG. 1, block 12) as $$\left(\frac{E_d}{E_p}\right)_{biased} = \frac{E_d|w^H h|^2 + w^H R_u w}{E_p|w^H h|^2} = \frac{E_d}{E_p} + \frac{1}{SINR_{pilot}} \qquad (9)$$

The scaling factor to correct the bias in estimation is computed (FIG. 1, block 14) as $$\text{scaling\_factor} = \frac{E_d/E_p}{E_d/E_p + 1/SINR_{pilot}} \qquad (10)$$

Note that the scaling factor depends upon the very quantity that we wish to estimate, which is ordinarily a problem. However, consider that equation (10) has the form X/(X+Y). Provided that Y≥0, any positive value for X results in a scaling factor greater than 0 and less than 1. Thus, the scale factor reduces the biased estimate of the data to pilot power ratio. Since the data to pilot power ratio is overestimated initially by equation (9), the biased estimate will be properly reduced in the direction of the true value. Using the biased estimate already obtained, the scaling factor is applied to the biased estimate (FIG. 1, block 16):

$$\left(\frac{E_d}{E_p}\right)_{estimate} = \left(\frac{E_d}{E_p}\right)_{biased} \frac{(E_d/E_p)_{biased}}{(E_d/E_p)_{biased} + 1/SINR_{pilot}} \qquad (11)$$

Embodiments are presented herein demonstrating practical ways to implement the method 10. These embodiments differ in how the SINR of the pilot channel is obtained. One embodiment performs a direct measurement of the pilot SINR. Another embodiment performs an indirect measurement of the pilot SINR.

According to one embodiment, in which the pilot SINR is directly measured, the method 10 may be performed in the following steps:

1. obtain the average combined data symbol power:

$$\Delta^2 = \frac{1}{CK} \sum_{c=0}^{N_c-1} \sum_{k=0}^{K-1} z_k^c (z_k^c)^*$$

2. compute pilot-based net channel coefficients:

$$\hat{h}_{pilot} = \frac{1}{N_p} \sum_{i=0}^{N_p-1} x_{pilot}(i) s^*(i),$$

where $x_{pilot}(i)$ is a vector of despread pilot symbols corresponding to the $i^{th}$ pilot symbol period in a slot, and $s(i)$ is the corresponding pilot symbol.

3. combine the pilot symbols: $z_i^{pilot} = w^H x_{pilot}(i)$ i=0, 1, ..., $N_p-1$.

4. compute the mean and variance of the combined pilot symbols:

$$\bar{z} = \frac{1}{N_p} \sum_{i=0}^{N_p-1} z_i^{pilot}$$

$$\sigma_{pilot}^2 = \frac{1}{N_p - 1} \sum_{i=0}^{N_p-1} (z_i^{pilot} - \bar{z})(z_i^{pilot} - \bar{z})^*$$

5. compute an estimate of the pilot SINR $$(SINR_{pilot})_{estimate} = \frac{\bar{z}\bar{z}^* - \sigma_{pilot}^2 / N_p}{\sigma_{pilot}^2}$$

6. compute a biased estimate of the data to pilot power ratio (FIG. 1, step 12):

$$\left(\frac{E_d}{E_p}\right)_{biased} = \frac{\Delta^2}{|w^H \hat{h}_{pilot}|^2}$$

7. compute the corrective scale factor (FIG. 1, step 14):

$$scaling\_factor = \frac{(E_d/E_p)_{biased}}{(E_d/E_p)_{biased} + 1/(SINR_{pilot})_{estimate}}$$

8. apply the scaling factor to obtain the data to pilot power ratio (FIG. 1, step 16):

$$\left(\frac{E_d}{E_p}\right)_{estimate} = \left(\frac{E_d}{E_p}\right)_{biased} (scaling\_factor)$$

According to another embodiment, in which the pilot SINR is indirectly measured, the method 10 may be performed in the following steps:

1. obtain the average combined data symbol power:

$$\Delta^2 = \frac{1}{CK} \sum_{c=0}^{N_c-1} \sum_{k=0}^{K-1} z_k^c (z_k^c)^*$$

2. compute pilot-based net channel coefficients:

$$\hat{h}_{pilot} = \frac{1}{N_p} \sum_{i=0}^{N_p-1} x_{pilot}(i) s^*(i)$$

3. combine the pilot symbols: $z_i^{pilot} = w^H x_{pilot}(i)$ i=0, 1, ..., $N_p-1$.

4. compute the mean and variance of the combined pilot symbols:

$$\bar{z} = \frac{1}{N_p} \sum_{i=0}^{N_p-1} z_i^{pilot}$$

$$\sigma_{pilot}^2 = \frac{1}{N_p - 1} \sum_{i=0}^{N_p-1} (z_i^{pilot} - \bar{z})(z_i^{pilot} - \bar{z})^*$$

5. compute an estimate of the pilot SINR:

$$(SINR_{pilot})_{estimate} = \frac{|w^H \hat{h}_{pilot}|^2}{\sigma_{pilot}^2}$$

6. compute a biased estimate of the data to pilot power ratio (FIG. 1, step 12):

$$\left(\frac{E_d}{E_p}\right)_{biased} = \frac{\Delta^2}{|w^H \hat{h}_{pilot}|^2}$$

7. compute the corrective scale factor (FIG. 1, step 14):

$$scaling\_factor = \frac{(E_d/E_p)_{biased}}{(E_d/E_p)_{biased} + 1/(SINR_{pilot})_{estimate}}$$

8. apply the scaling factor to obtain the data to pilot power ratio (FIG. 1, step 16):

$$\left(\frac{E_d}{E_p}\right)_{estimate} = \left(\frac{E_d}{E_p}\right)_{biased} (scaling\_factor)$$

Figure 2:
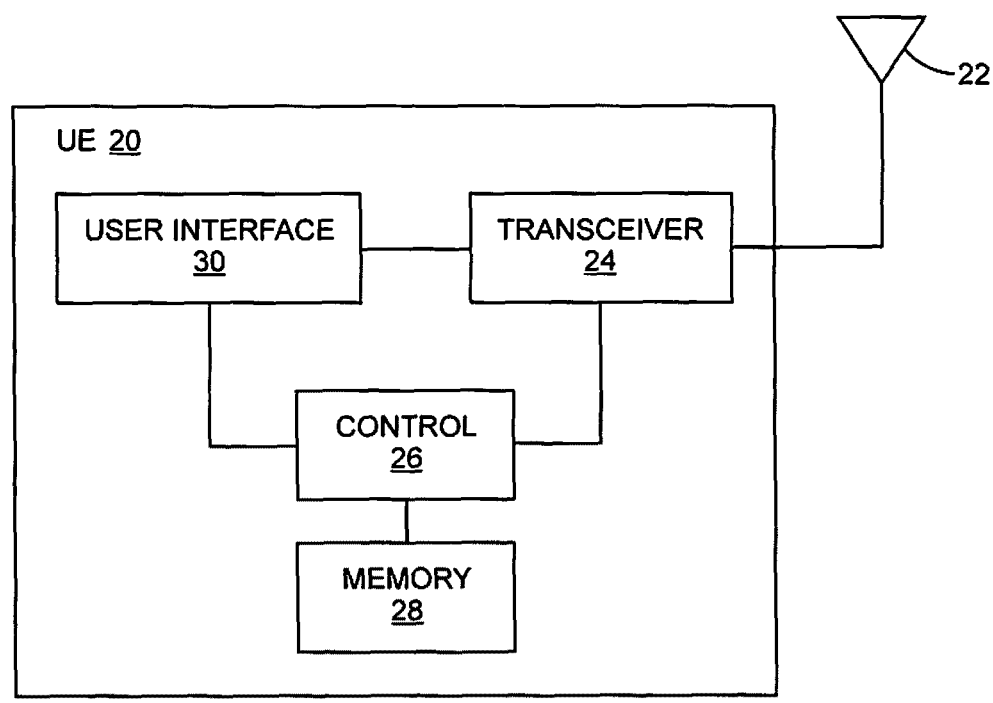
FIG. 2 depicts a representative UE 20 operative to implement the method 10.

The method 10 of obtaining an accurate estimate of the data to pilot power ratio may be implemented in a receiver in a fixed network Access Point, such as base station or Node B, or in a receiver in a mobile User Equipment (UE). FIG. 2 depicts a representative UE 20 operative to implement the method 10. The UE 20 includes a transceiver 24, antenna 22, controller 26, memory 28, and user interface 30. The UE 20 may include additional circuits, modules, and functional blocks not depicted in FIG. 2 for clarity. The transceiver 24, which may be connected to one or more antennas 22, includes transmitter and receiver circuits operative to send and receive data to and from a CDMA network. In one embodiment, the UE 20 may include only a receiver. Operation of the transceiver 24, as well as overall operation of the UE 20, is controlled by a controller 26, which may comprise a general-purpose, stored-program microprocessor executing software programs; a Digital Signal Processor; a logical state machine; or other controller as known in the art. The controller 26 is operatively connected to memory 28, which may store one or more software modules operative to implement the method 10 on the controller 26. In another embodiment, the memory 28 may be integrated with the controller 26.

A user interface 30 allows a user to interact with and control the operation of the UE 20. The user interface 30 may include a direct connection to the transceiver 24, allowing it to send voice signals to, and receive audio from, the transceiver 24, under control of the controller 26. The user interface 30 may include input means such as a keypad, keyboard, buttons, switches, touchscreen, microphone, camera, or the like, and may further include output means such as one or more display screens, LEDs, a speaker, or the like, as known in the art. In some embodiments, in which the UE 20 may comprise a data communication interface to other data processing or communication equipment, the user interface 30 may be omitted.

The controller 26 is operative to control the transceiver 24 and other UE 20 circuits to obtain data and pilot symbols and other relevant information and metrics, and is operative to perform calculations and computations to implement the method 10, depicted in FIG. 1, of obtaining an accurate estimate of the data to pilot power ratio.

Embodiments of the present invention yield data to pilot power estimates that are less noisy than those provided by prior art methods. The method 10 is very simple to implement, and for the expected operating region of HSDPA, the estimates are quite accurate.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method of determining a data to pilot power ratio in a CDMA wireless communication network, comprising:
    receiving pilot symbols in a pilot channel and data symbols in a data channel;
    obtaining a biased estimate of the data to pilot power ratio based on the data symbols, wherein obtaining the biased estimate of the data to pilot power ratio based on the data symbols further comprises:
        obtaining an average combined data symbol power;
        computing pilot-based net channel coefficients;
        combining the pilot symbols;
        computing the mean and variance of the combined pilot symbols;
        computing an estimate of a pilot SINR based on at least the variance of the combined pilot symbols; and
        computing the biased estimate of the data to pilot power ratio based on the average combined data symbol power and pilot-based net channel coefficients;
    computing a multiplicative correction factor from the pilot channel; and
    applying the correction factor to the biased estimate data to pilot power ratio to obtain a more accurate data to pilot power ratio estimate.

2. The method of claim 1 wherein computing an estimate of the pilot SINR based on at least the variance of the combined pilot symbols comprises computing an estimate of the pilot SINR based on the mean and variance of the combined pilot symbols.

3. The method of claim 2 wherein the pilot SINR is measured directly.

4. The method of claim 1 wherein computing an estimate of the pilot SINR based on at least the variance of the combined pilot symbols comprises computing an estimate of the pilot SINR based on the pilot-based net channel coefficients and the variance of the combined pilot symbols.

5. The method of claim 4 where the pilot SINR is measured indirectly.

6. The method of claim 1 wherein computing a multiplicative correction factor from the pilot channel comprises computing a multiplicative correction factor based on the biased estimate of the data to pilot power ratio and the estimate of the pilot SINR.

7. The method of claim 1 wherein applying the correction factor to the biased data to pilot power ratio estimate to obtain a more accurate data to pilot power ratio estimate comprises multiplying the biased estimate of the data to pilot power ratio by the multiplicative correction factor.

* * * * *

UNITED STATES PATENT AND TRADEMARK OFFICE
CERTIFICATE OF CORRECTION

PATENT NO.        : 8,605,771 B2
APPLICATION NO.   : 12/637838
DATED             : December 10, 2013
INVENTOR(S)       : Cairns It is certified that error appears in the above-identified patent and that said Letters Patent is hereby corrected as shown below:

In the Drawings

In Fig. 2, Sheet 2 of 2, in Box "26", in Line 1, delete "CONTROL" and insert -- CONTROLLER --, therefor.

In the Specification

In Column 5, Line 35, delete "SINR" and insert -- SINR: --, therefor.

In the Claims

In Column 8, Line 34, in Claim 5, delete "where" and insert -- wherein --, therefor.

Signed and Sealed this
Fifteenth Day of July, 2014

Michelle K. Lee
*Deputy Director of the United States Patent and Trademark Office*